July 22, 1958     M. B. CURLEY     2,844,207
ADJUSTABLE FAN BLADE ASSEMBLY
Filed Aug. 2, 1955
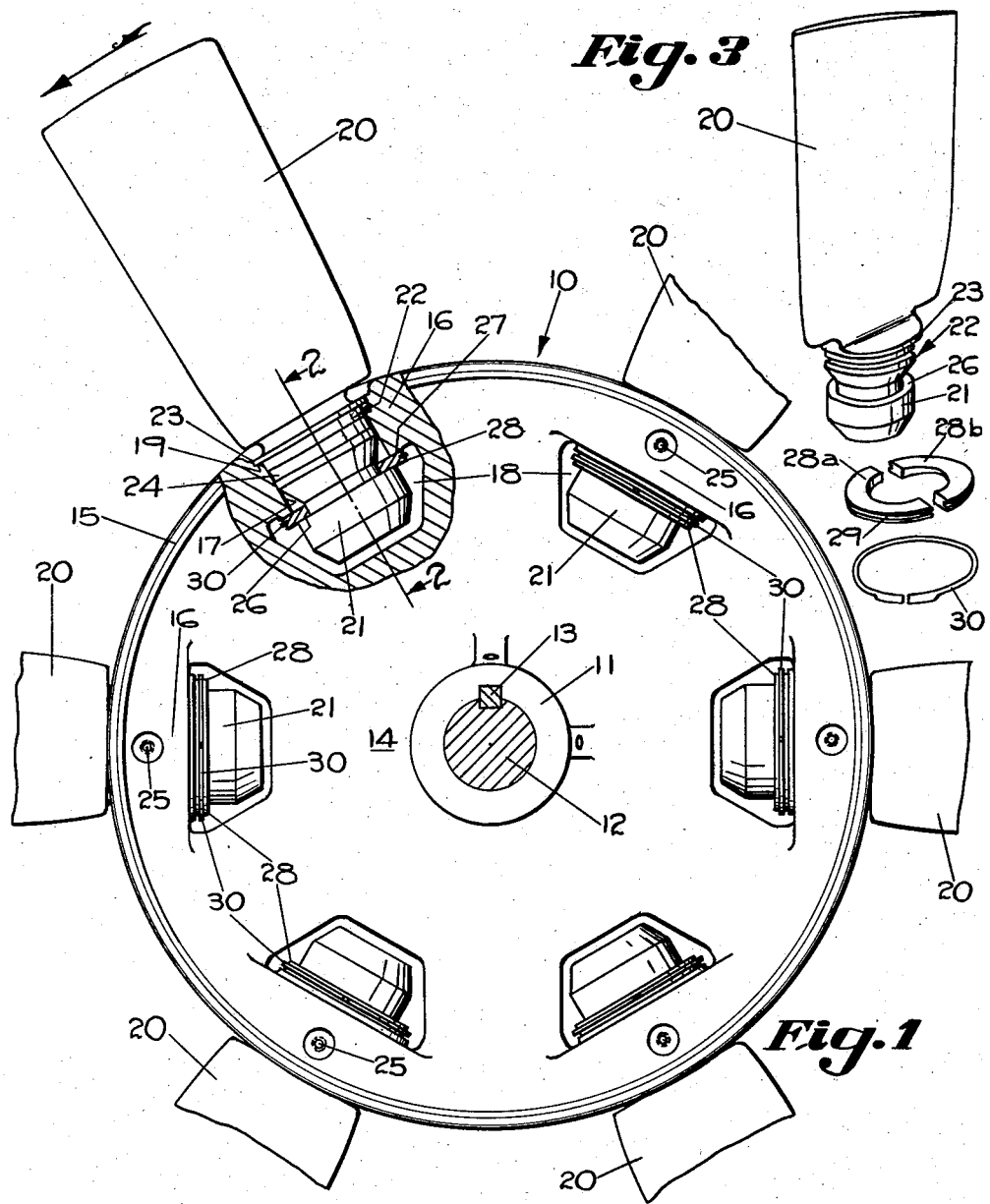
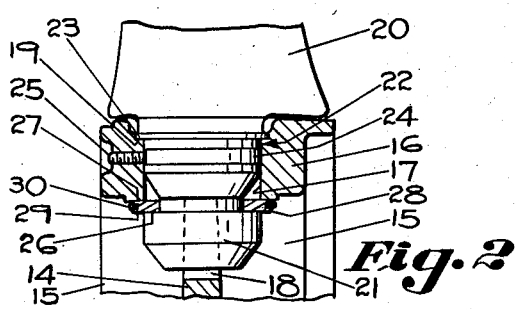
INVENTOR;
MORTON B. CURLEY,
ATTY.

United States Patent Office 2,844,207
Patented July 22, 1958

2,844,207

ADJUSTABLE FAN BLADE ASSEMBLY

Morton B. Curley, Gahanna, Ohio, assignor to The Jeffrey Manufacturing Company, a corporation of Ohio Application August 2, 1955, Serial No. 525,968

2 Claims. (Cl. 170—160.6)

The instant invention relates to a ventilator or fan and more particularly to an improved rotor construction including novel means for mounting the fan blades on the rotor.

It is an object of the invention to provide a novel rotor and fan blade construction, including means for retaining the fan blade assembled on the rotor and preventing radial displacement of the fan blade during rotation of the rotor.

It is another object of the invention to provide a novel rotor and fan blade construction, wherein the rotor includes sockets for mounting the fan blades on the rotor and means interposed between each fan blade and each socket for retaining the fan blades assembled on the rotor and preventing radial displacement of the fan blades during rotation of the rotor.

Yet another object of the invention is to provide a novel rotor and fan blade construction, including means for securing a plurality of fan blades to the rotor and permitting the pitch angle of the blades to be selectively set.

Other objects of the invention will appear hereinafter, the novel features and combinations being set forth in the appended claims.

In the accompanying drawings:

Fig. 1 is a front elevational view of the novel fan construction;

Fig. 2 is a partial sectional view taken on the line 2—2 in Fig. 1; and

Fig. 3 is a perspective view of the fan blade and the blade retaining means.

Referring to Fig. 1 the novel fan construction includes a blade supporting rotor 10 formed with a rotor mounting hub 11 adapted to be mounted on a rotatable driving shaft 12 and fixed thereto by a securing key 13. The shaft 12 may be driven by conventional motor means and the rotor 10 rotates therewith.

A connecting web 14 projects radially from the mounting hub 11 and terminates in a circumferential rim 15 which extends laterally to each side of the connecting web 14 at the perimeter thereof. At a plurality of evenly spaced locations on the rim 15, the connecting web 14 is formed with enlarged socket portions 16 adjacent to and behind the rim 15. Each of said enlarged socket portions 16 is bored radially with respect to the mounting hub 11 to provide a plurality of blade supporting cylindrical sockets 17 for the mounting of the fan blades 20, as will be described in greater detail hereinafter. A portion of the connecting web 14 underlying each of the enlarged socket portions 16 thereof is cut away, leaving assembly openings 18 providing access to the shanks 21 of the fan blades 20, and permitting the fan blade securing means to be assembled therewith for securing the blades 20 to the blade supporting rotor 10.

Each of the fan blades 20 is formed on an integral cylindrical hub 22 which includes an integral, radially projecting bearing ring 23 adapted to seat on a bearing shoulder 19 formed at the outer end of each of the blade supporting sockets 17. The fan blade hub 22 fits into the blade supporting socket 17 with the shank 21 extending inwardly therefrom towards the rotor mounting hub 11 and being located within the assembly opening 18. The hub 22 is formed with a locking band 24 of reduced diameter against which there is seated a locking set screw 25 threaded through the enlarged socket portion 16. Each hub 22 is rotatable in its blade supporting socket 17 about its radially extending longitudinal axis to permit the pitch angle of each fan blade 20 to be selectively set for the desired volume of air. Upon setting the blades 20 to the desired angle, the locking set screws 25 are tightened against locking bands 24 to secure the blades 20 in the adjusted position.

The fan blade hub 22 is integral with the fan blade shank 21 and is connected thereto by a reduced diameter portion forming a fan blade assembly shoulder 26 which is spaced radially inwardly from a rotor assembly shoulder 27 formed at the inner end of the blade supporting socket 17. The fan blades 20 are each secured to the rotor 10 by a retaining ring 28 seating on the fan blade shank 21 intermediate the assembly shoulders 26, 27 and bearing thereagainst, whereby the fan blades 20 are secured against radial displacement relatively to the blade supporting rotor 10. The retaining ring 28 is composed of two segmental portions 28a, 28b which are fitted to the fan blade shank 21 through the assembly opening 18 in the rotor web 14. The retaining ring 28 is provided with an annular peripheral groove 29 for the reception of a snap ring 30 embracing the retaining ring segments 28a, 28b and preventing separation thereof. The snap ring 30 is installed through the assembly opening 18 and is made of spring material so that it may be spread around the retaining ring 28 and snapped into the groove 29. It will be understood that while the retaining ring 28 bears against the assembly shoulders 26, 27 to prevent radial displacement of the fan blade 20, it permits the fan blade hub 22 to be rotated in the socket 17 merely upon release of the locking set screw 25, for adjustment of the pitch angle of the blade 20.

It is also obvious that by loosening the set screw 25 and removing the snap ring 30 and retaining ring 28 of any blade 20, said blade may readily be easily removed by pulling it radially to remove the blade hub 22 from the associated socket 16. By a simple reverse operation a blade may be readily attached to the rotor 10. Removal of one or more blades 20 for repair, replacement or inspections is thus provided.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a rotary fan, the combination of a fan blade supporting rotor and a fan blade mounted on the rotor to extend radially therefrom, said rotor comprising a peripheral rim extending in an axial direction and an integral web disposed within the rim, a socket in the rotor formed in the rim and extending radially inwardly therefrom into the web for mounting the fan blade, a hub on the fan blade adapted to be received in the socket and supporting said blade on the rotor, an assembly opening in the rotor disposed radially inwardly beyond the socket, said assembly opening being formed in the rotor web and extending at least the width of the socket, a shank integral with the fan blade hub projecting beyond the socket into said assembly opening, an assembly shoulder formed on the shank adjacent to the socket, a second assembly shoulder formed at the end of the socket and disposed in the assembly opening adjacent to the shoulder on the shank, and fan blade retaining means insertable through the assembly opening in the rotor adapted to be interposed between the fan blade shank and the socket and bearing on the assembly shoulders for securing the fan blade to the supporting rotor and preventing radial displacement of the fan blade during rotation of the rotor, said fan blade retaining means comprising a segmental retaining ring surrounding the fan blade shank, opposite sides of the retaining ring bearing on the assembly shoulders, the segments of the retaining ring being insertable through the assembly opening, and a snap ring embracing the segments of the retaining ring to hold the retaining ring in assembled position.

2. In a rotary fan, the combination of a fan blade supporting rotor and a fan blade mounted on the rotor to extend radially therefrom, said rotor comprising a peripheral rim extending in an axial direction and an integral web disposed within the rim, a socket in the rotor formed in the rim and extending radially inwardly therefrom into the web for mounting the fan blade, a hub integral with the fan blade adapted to be received in the socket and supporting said blade on the rotor for rotation relatively to the latter for adjustment of the pitch angle of the fan blade, set screw means threaded in the socket cooperating with the fan blade hub for locking the fan blade in adjusted position, an assembly opening in the rotor disposed radially inwardly beyond the socket, said assembly opening being formed in the rotor web and extending at least the width of the socket, a shank integral with the fan blade hub projecting beyond the socket into the assembly opening, an assembly shoulder formed on the shank adjacent to the socket, a second assembly shoulder formed at the end of the socket and disposed in the assembly opening adjacent to the shoulder on the shank, and fan blade retaining means insertable through the assembly opening in the rotor adapted to be interposed between the fan blade shank and the socket, and bearing on the assembly shoulders for securing the fan blade to the supporting rotor and preventing radial displacement of the fan blade during rotation of the rotor.

References Cited in the file of this patent

UNITED STATES PATENTS

| | | |
|---|---|---|
| 425,585 | Seymour | Apr. 15, 1890 |
| 1,875,606 | Houston | Sept. 6, 1932 |
| 2,307,490 | Curley | Jan. 5, 1943 |
| 2,664,961 | Goede | Jan. 5, 1954 |